(12) United States Patent
Shigetaka

(10) Patent No.: US 6,781,577 B2
(45) Date of Patent: Aug. 24, 2004

(54) CAPACITIVE SENSOR-BASED INPUT DEVICE

(75) Inventor: Hiroshi Shigetaka, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 427 days.

(21) Appl. No.: 09/898,508

(22) Filed: Jul. 3, 2001

(65) Prior Publication Data

US 2002/0039092 A1 Apr. 4, 2002

(30) Foreign Application Priority Data

Jul. 4, 2000 (JP) .......................................... 2000-202003
Feb. 7, 2001 (JP) .......................................... 2001-030882

(51) Int. Cl.[7] ................................................. G09G 5/00
(52) U.S. Cl. ....................... 345/173; 345/174; 345/175; 345/176; 345/177; 345/178; 178/18.01; 178/18.02; 178/18.03; 178/18.04; 178/18.05; 178/18.06; 178/18.09; 178/18.11
(58) Field of Search ............................ 345/173, 174–178; 178/18.01–18.06, 18.09, 18.11

(56) References Cited

U.S. PATENT DOCUMENTS 4,733,222 A * 3/1988 Evans .......................... 341/33
5,305,017 A 4/1994 Gerpheide
6,028,271 A * 2/2000 Gillespie et al. .......... 178/18.01

* cited by examiner

Primary Examiner—Richard Hjerpe
Assistant Examiner—Jean Lesperance
(74) Attorney, Agent, or Firm—Brinks Hofer Gilson & Lione

(57) ABSTRACT

A capacitive sensor-based input device for coordinate data input includes an input unit that detects the variation of capacitances at a plurality of detection points, and a control unit that calculates detection outputs from the plurality of detection points to detect the peak position in the variation of capacitances to generate coordinate data. When the maximum value detected at any one of the detection points transitions relative to the previous and following values by less than a first threshold value, the coordinate data is cancelled. When it varies by more than the first threshold value but less than a second threshold value, a corrected value to generate the coordinate data is decreased, thereby suppressing an oscillation of a cursor on a screen while a finger rests on the input device.

28 Claims, 7 Drawing Sheets

CAPACITIVE SENSOR-BASED INPUT DEVICE

BACKGROUND OF THE INVENTION

1. Field of the Invention

The present invention generally relates to input devices, and more particularly to an input device using a capacitive sensor-based input unit for coordinate data input.

2. Description of the Related Art

In general, a notebook computer is provided with an input pad as a coordinate data input device. One known coordinate data sensor of the input pad is a capacitive sensor.

The capacitive sensor-based input pad includes X-electrodes formed at a predetermined interval and Y-electrodes formed at a predetermined interval, which face each other across an insulation layer having a predetermined permittivity. Once a finger or a conductor such as a pen touches a protective sheet which overlays either of the X- or Y-electrodes, the capacitances between the X-electrodes and the Y-electrodes vary at the location where it touches the protective sheet.

The input pad includes a controller for calculating the peak in the variation of capacitances between the X- and Y-electrodes to generate X-Y coordinate data from the resulting value, which is then fed to a main controller of a computer.

In the capacitive sensor-based input pad, however, the variation of capacitances between the electrodes exhibits different sharpness depending upon the area of the portion of protective sheet which the conductor touches. For example, when a small area of the protective sheet is touched with a pen or a fingertip, the variation of capacitances depicts a sharply curved profile. On the other hand, when a larger area of the protective sheet is touched such as with a finger pad, the variation of capacitances depicts a gently curved profile. When a palm unintentionally touches the protective sheet during a keyboard operation, the capacitances also vary with a modest varying rate. As a result, problems occur as follows.

First, once a palm touches an input pad as mentioned above, coordinate data is output from the input pad although it is not intended to use the input pad for coordinate data input. Second, while a finger pad touches a larger area of the protective sheet and rests thereon, the peak in variation of capacitances changes over time, resulting in a sequential output of finely changing coordinate data. Therefore, a cursor or the like appears to finely oscillate on a computer screen.

SUMMARY OF THE INVENTION

Accordingly, it is an object of the present invention to provide an input device which prevents coordinate data from being output, for example, when a palm unintentionally touches an input pad.

It is another object of the present invention to provide an input device capable of generating coordinate data so as to provide a less noticeable oscillation of a cursor on a screen when the variation of capacitances depicts a gently curved profile.

To this end, in an aspect of the present invention, an input device includes an input unit that detects the variation of capacitances at a plurality of detection points Ni (i is an integer), and a control unit that calculates detection outputs from the plurality of detection points Ni to determine the peak position P in the variations of capacitances to generate coordinate data from the peak position P. The calculation is performed using the maximum value detected at any one of the detection points Ni, the previous value detected at at least one previous point, and the following value detected at at least one point which follows the detection point at which the maximum value is obtained. When the maximum value transitions relative to the previous and following values by less than a first threshold value, the control unit does not output the coordinate data.

Therefore, for example, when a palm unintentionally touches the input device, the coordinate data is not output, and an erroneous detection can be avoided.

In another aspect of the present invention, an input device includes an input unit that detects the variation of capacitances at a plurality of detection points Ni (i is an integer), and a control unit that calculates detection outputs from the plurality of detection points Ni to determine the peak position P in the variation of capacitances to generate coordinate data at a fixed time interval from the peak position P. The control unit performs a correction between the peak position P determined at a given point and coordinate data M obtained at the previous point such that a corrected value which is smaller than (P-M) is added to the coordinate data M. Further, the calculation is performed using the maximum value detected at any one of the detection points Ni, the previous value detected at at least one previous point, and the following value detected at at least one point which follows the detection point at which the maximum value is generated to make a correction. The corrected value varies such that when the maximum value changes by less than a second threshold value relative to the previous and following values the corrected value is less than the corrected value when the maximum value changes by more than the second threshold value.

The input device according to the present invention allows for a coordinate detection with a high accuracy when the variation of capacitances exhibits a gently curved profile.

Preferably, the correction in which the corrected value is made smaller is performed when the displacement of the peak position P which is determined at a fixed time interval is within a predetermined distance.

For example, when a finger rests on the input unit, the oscillation of a cursor on a screen is suppressed.

The corrected value may be calculated by subtracting (Mn−1) from Pn or a function of Pn and by dividing the resulting value by a predetermined integer m, where Pn indicates the peak position determined at a given time, and (Mn−1) indicates the coordinate data determined at the previous time.

The correction may be performed using the integer m as a predetermined value when the displacement of the peak value P which is determined at a fixed time interval is within a predetermined distance. The correction using the same integer m or a different integer may be additionally performed when the maximum value transitions relative to the previous and following values by less than the second threshold value.

Preferably, the value calculated from (2B−A−C) is compared to any one of the threshold values, where B denotes the maximum value at any of the detection points Ni, A denotes the previous value, and C denotes the following value.

The coordinate of the peak position may be defined by the following equation:

$$P = \text{(coordinate of } B\text{)} - \frac{A - C}{2(2B - A - C)}$$

DESCRIPTION OF THE PREFERRED EMBODIMENTS

Figure 4:
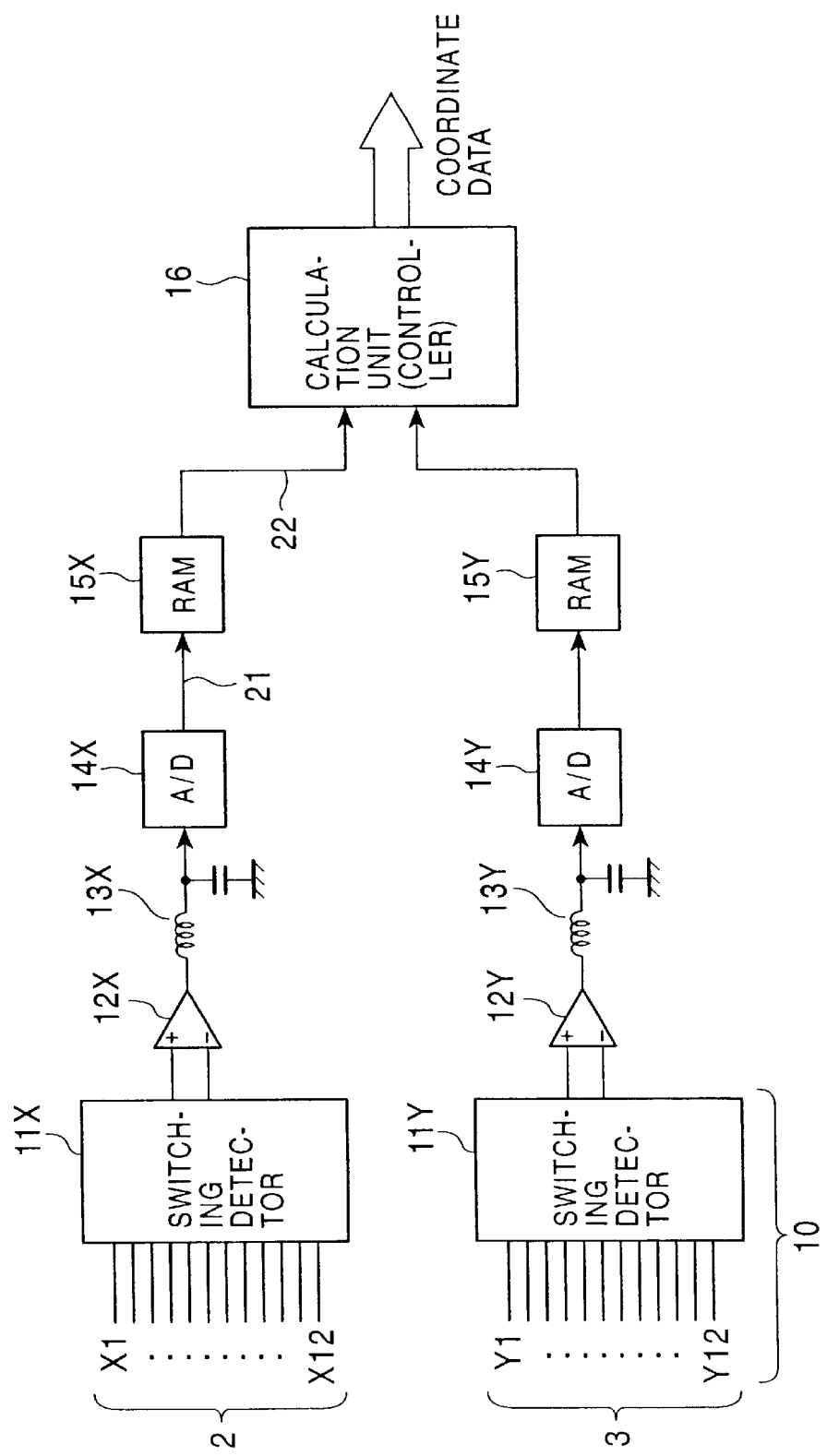
FIG. 4 is a block diagram of the structure of the input device according to the present invention.

FIG. 4 is a block diagram of the structure of an input device according to the present invention. The input device includes a planar input pad 10, which is a capacitive sensor-based input device, for inputting X-Y coordinate position data.

Figure 6:
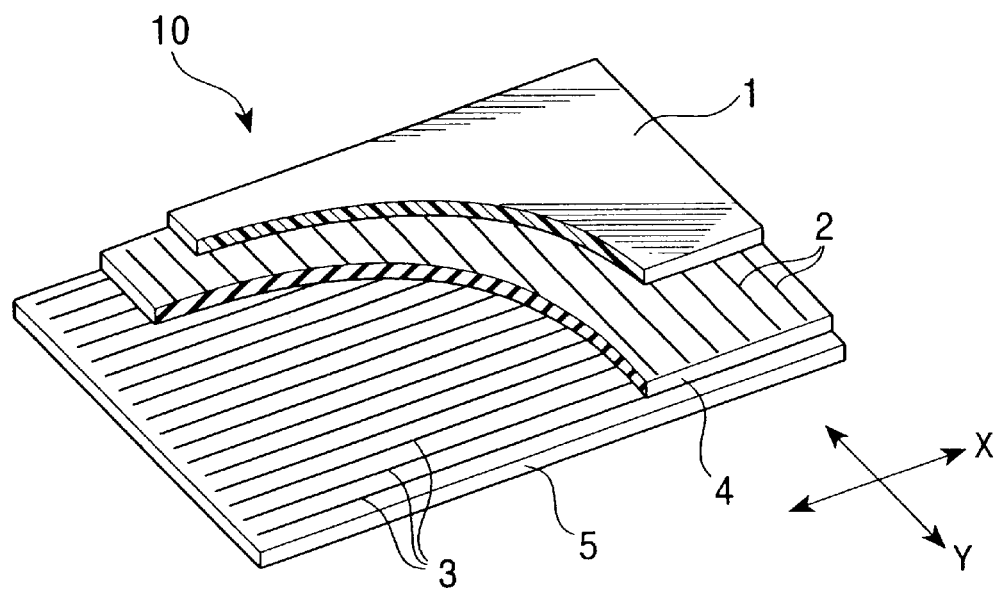
FIG. 6 is a perspective view of a capacitive sensor-based input pad.

Referring to FIG. 6, the input pad 10 is formed of a protective sheet 1, a plurality of X-electrodes 2, a plurality of Y-electrodes 3, and an insulating sheet 4 interposed between the X-electrodes 2 and the Y-electrodes 3, which are stacked over a substrate 5. The X-electrodes 2 are horizontally (in the X direction) spaced apart at a fixed interval, and the Y-electrodes 3 are vertically (in the Y direction) spaced apart at a fixed interval, such that the X-electrodes 2 and the Y-electrodes 3 face each other so as to form a matrix.

Figure 7:
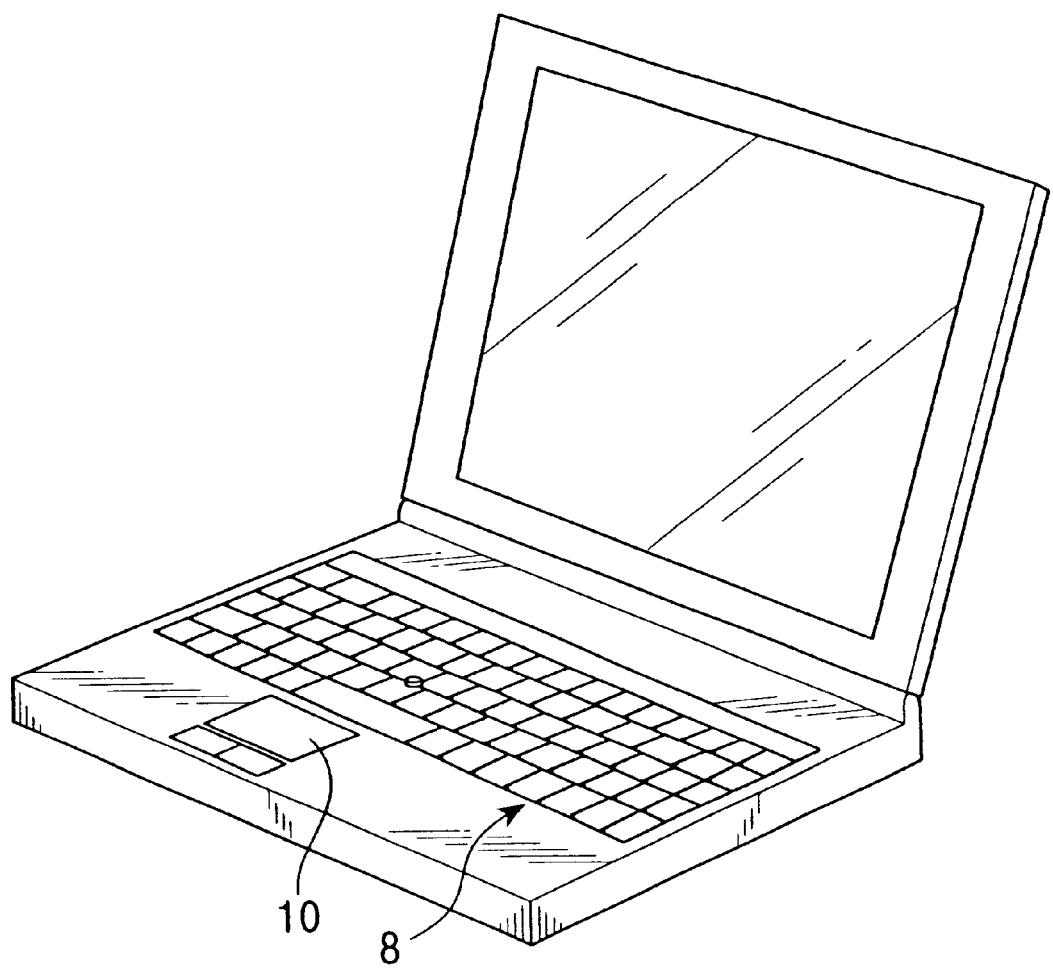
FIG. 7 is a perspective view of a notebook computer incorporating the input pad.

The input pad 10 is incorporated in a notebook computer as illustrated in FIG. 7, by way of example. Typically, the input pad 10 is located closer to an operator than a keyboard 8.

Referring again to FIG. 4, the plurality of X-electrodes 2 are connected to a switching detector 11X, and the plurality of Y-electrodes 3 are connected to a switching detector 11Y. Followed by the switching detector 11X and the switching detector 11Y are a differential amplifier 12X and a differential amplifier 12Y, respectively. The differential outputs from the differential amplifiers 12X and 12Y are smoothed by smoothing circuits 13X and 13Y, and are passed to A/D converters 14X and 14Y, respectively. The digital signals converted by the A/D converters 14X and 14Y are stored and accumulated in RAMs 15X and 15Y, respectively.

The values accumulated in the RAMs 15X and 15Y are fed to a controller 16 having a calculation function. The controller 16 determines the peak position in the variation of capacitances in the X- and Y-directions. Based on the resulting peak position, the X coordinate data and the Y coordinate data are calculated and are output to a main controller of the computer. The controller 16 may be implemented using multiple pieces of analog (or digital) hardware or may be implemented with limited hardware primarily using software.

In the input device, the peak positions Px in the variation of capacitances in the X direction and the peak positions Py in the variation of capacitances in the Y direction are alternately determined in a time-divisional manner.

If a finger or a conductor such as a pen touches the protective sheet 1 while an electric field having a predetermined potential is applied to all of the X-electrodes 2 (X1 ... X12) and the Y-electrodes 3 (Y1 ... Y12), then the capacitances between the X-electrodes 2 and the Y-electrodes 3 vary at the location where it touches the protective sheet 1.

To provide the Y coordinate data, pairs of the X-electrodes 2 are selected by the switching detector 11X, and pairs of detection outputs corresponding to the varying capacitances between the X-electrodes 2 and the Y-electrodes 3 are fed to the differential amplifier 12X. Specifically, detection outputs for the varying capacitances detected at a pair X1 and X2 of the X electrodes 2 are fed to the differential amplifier 12X. In turn, detection outputs for an X-electrode pair X2 and X3, detection outputs for an X-electrode pair X3 and X4, and so on are fed to the differential amplifier 12X.

To provide the Y coordinate data, pairs of the Y-electrodes 3 are selected, and detection outputs for the varying capacitances detected at the Y-electrode pairs are fed in turn to the differential amplifier 12Y from the switching detector 11Y. Pairs Y1 and Y2, Y2 and Y3, and so on of the Y-electrodes 3 are selected in turn. The detection outputs from all electrodes of the X-electrodes 2 and all electrodes of the Y-electrodes 3 are alternately applied in a time-divisional manner.

A description is now made on how the peak position is determined when pairs of the X-electrodes 2 are selected and how the X coordinate data is calculated. It will be noted that the same procedure is performed for the Y coordinate data.

The switching detector 11X is used to provide detection outputs for the varying capacitances from a pair of X-electrodes 2, which are then passed to the differential amplifier 12X, where the differential detection output between the X-electrode pair is determined. The differential output is then smoothed by the smoothing circuit 13X, and is converted into a digital value by the A/D converter 14X. The resulting differential output is depicted as a curved profile 21 in the lower portion of FIG. 1.

Figure 1:
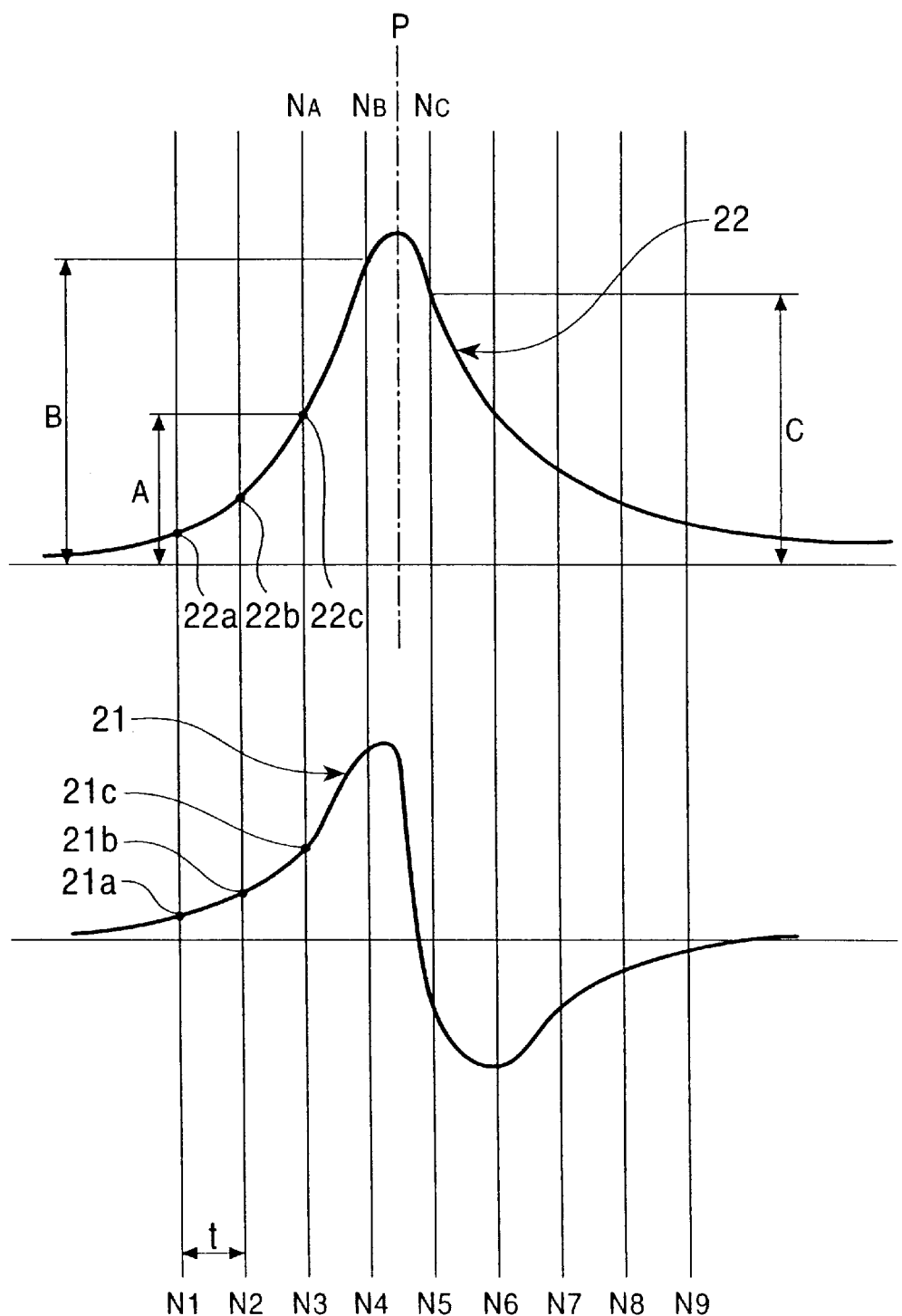
FIG. 1 is a waveform of the variation of capacitances detected in an input device according to one embodiment of the present invention.

In FIG. 1, detection points (during detection) corresponding to the timing at which the X-electrodes 2 are switched are generally indicated by Ni (detection points N1, N2, N3, and so on). The differential output 21a between the detection output of the X-electrode X2 and the detection output of the X-electrode X1 is determined at the detection point Ni. The differential output 21b between the detection output of the X-electrode X3 and the detection output of the X-electrode X2 is determined at the detection point N2.

The differential outputs 21a, 21b, 21c, and so on at the respective detection points Ni, N2, N3, and so on are sequentially accumulated in the RAM 15X, as generally represented by a differential output 22 in the upper portion of FIG. 1. FIG. 1 depicts accumulation outputs 22a, 22b, 22c, etc., at the detection points N1, N2, N3, etc. The accumulation outputs 22a, 22b, 22c, etc. are monitored by the controller 16 to specify a detection point at which the maximum value in the accumulation outputs is determined. As is anticipated in the upper diagram of FIG. 1, the maximum value B is determined at the detection point $N_B$, and the previous value A at the previous detection point $N_A$ and the following value C at the detection point $N_B$ which follows the detection point $N_B$ are lower than the maximum value B.

In the upper portion of FIG. 1, the accumulation output 22 varies in the same manner as or a similar manner to the variation of capacitances in the X direction between the X-electrodes 2 and the Y-electrodes 3. Since the following value C is greater than the previous value A, it is expected that the peak position P in the variation of capacitances exists between the detection point $N_B$ and the detection point $N_C$. The peak position P corresponds to a location at which a finger or a pen points on the input pad 10.

The location of peak position P on the X coordinate is defined by the controller 16 using the following equation.

$$P = \text{(coordinate of } B\text{)} - \frac{A - C}{2(2B - A - C)}$$

Figure 2:
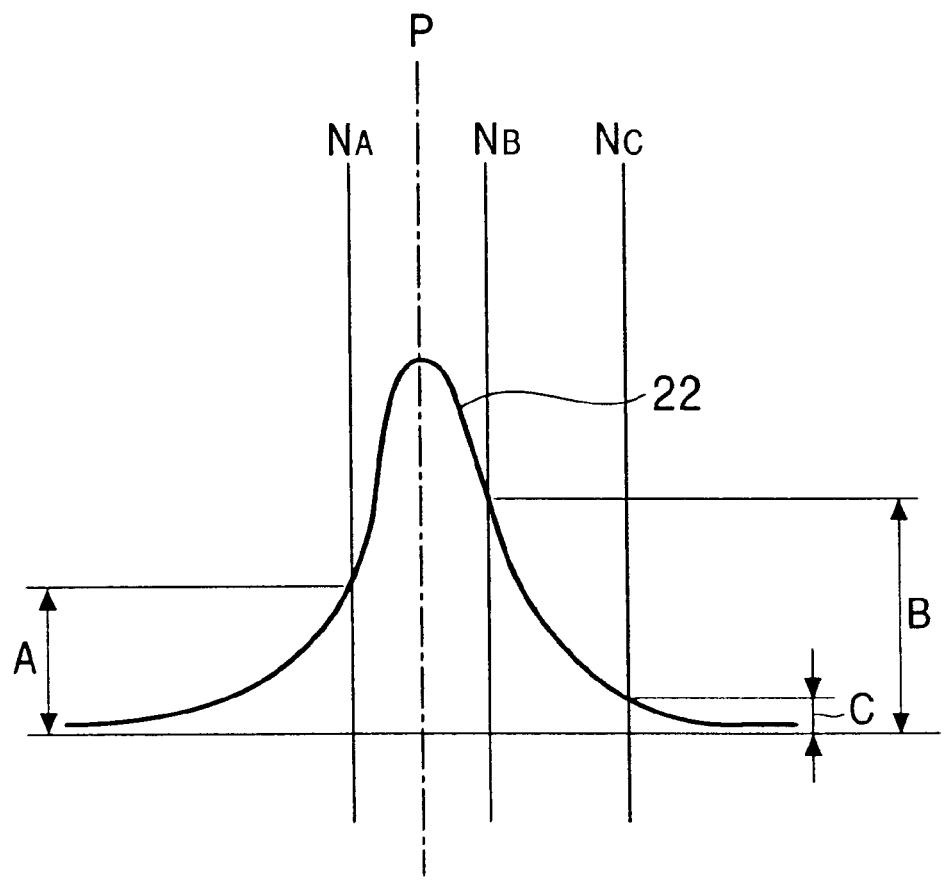
FIG. 2 is a waveform when the accumulation output exhibits a sharply curved profile.

The amount of varying capacitances in the X direction which is detected on the input pad 10 depends upon the extent how a conductor touches the protective sheet 1. For example, when a smaller area of the protective sheet 1 is touched with a pen or a fingertip, the variation of capacitances in the X direction exhibits a sharply curved profile as shown in FIG. 2. On the other hand, when a palm unintentionally touches the input pad 10 while the keyboard 8 of the notebook computer shown in FIG. 7 is operated with fingers, the variation of capacitances in the X direction exhibits a gently curved profile with a modest varying rate as depicted in FIG. 3.

The controller 16 calculates (2B−A−C) using the maximum value B determined at the detection point $N_B$, the previous value A at the previous detection point $N_A$ and the following value C at the detection point $N_C$ which follows the detection point $N_B$. If the resulting value is equal to or smaller than a first predetermined threshold value, the controller 16 neglects the detected peak value P, thereby preventing the coordinate data from being generated, and no coordinate data is thus output to the main controller of the computer.

Figure 3:
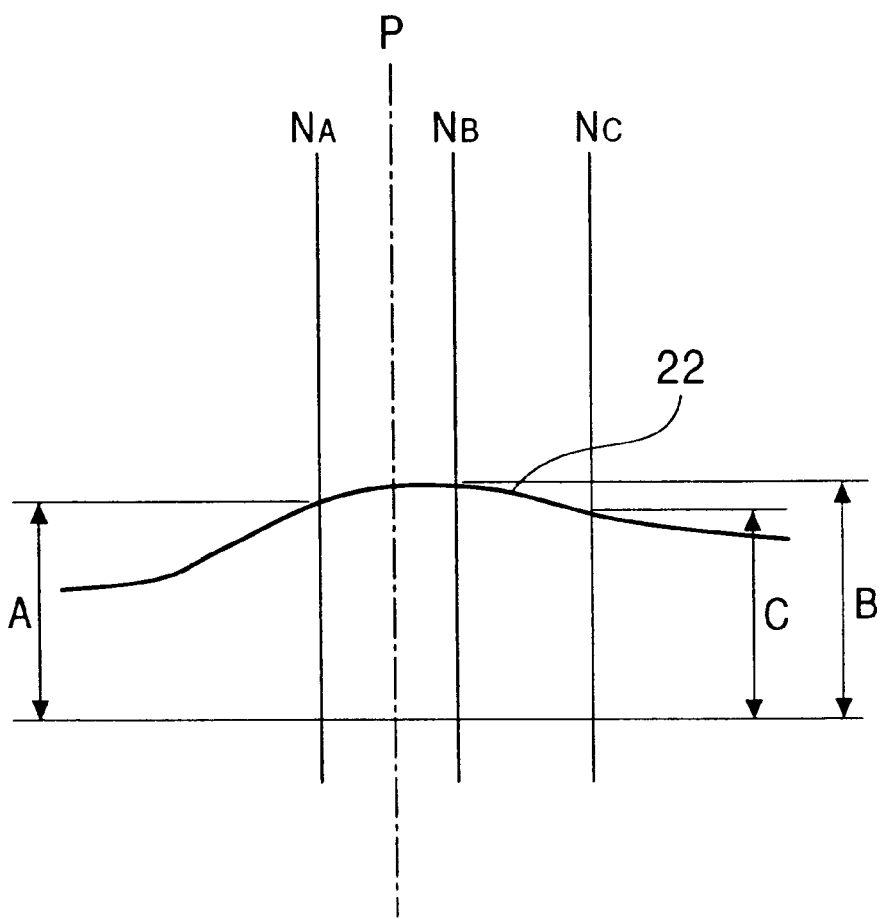
FIG. 3 is a waveform when the accumulation output exhibits a gently curved profile.

For example, the resulting value of (2B−A−C) is greater in FIG. 2, but it is smaller in FIG. 3. That is, when the maximum value B determined at the detection point $N_B$ is greater than the previous value A and the following value C by more than a predetermined magnitude, the profile as shown in FIG. 2 is resulted. Otherwise, the profile as shown in FIG. 3 is resulted. Accordingly, the first threshold value which is preset can prevent the coordinate data from being output from the controller 16 such as when a palm unintentionally touches the input pad 10.

Figure 5:
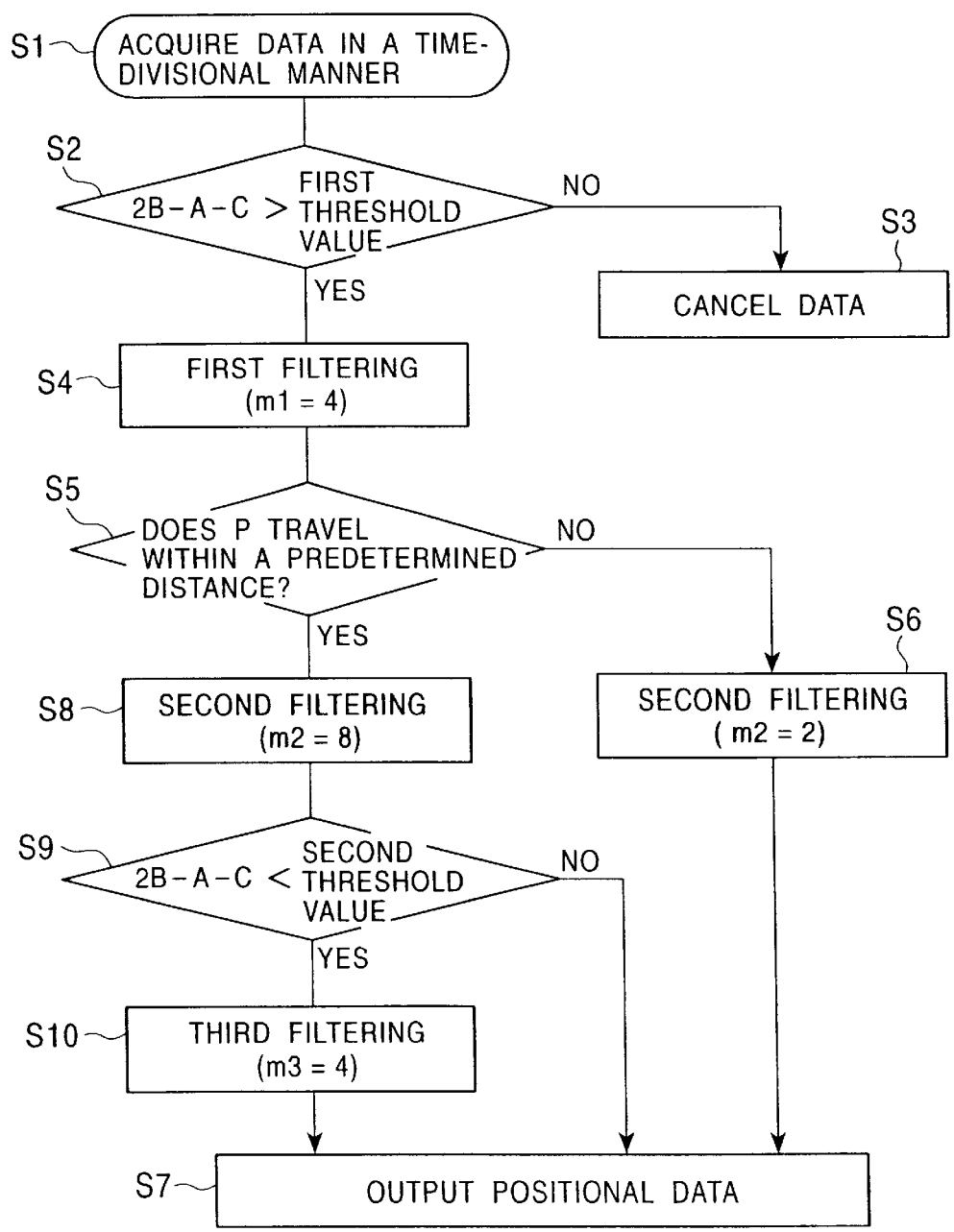
FIG. 5 is a control flowchart of a controller.

FIG. 5 is a control flowchart of the controller 16. At step S1, data for the X-electrodes 2 is retrieved from the RAM 15X in a time-divisional manner. At step S2, (2B−A−C) is calculated on the accumulation output 22 from the RAM 15X, and the resulting value is compared to the first threshold value. When the resulting value is not greater than the first threshold value, the data of the peak position P is cancelled (step S3).

When the value calculated from (2B−A−C) exceeds the first threshold value at step S2, the controller 16 generates coordinate data from the value of the peak position P. The coordinate data is determined in such a way as follows.

First, at step S4 in FIG. 5, the peak value P is first filtered for a first-stage correction. The first filtered data is shown in Table 1 below.

TABLE 1

| Retrieved Data No. | Peak Position | First Filtered Data (1/4 average) | Second Filtered Data (1/8 or 1/2 average) | Third Filtered Data (1/4 average) |
|---|---|---|---|---|
| 1 | P1 | P1 = M11 | P1 = M21 | P1 = M31 |
| 2 | P2 | $M11 + \frac{P2 - M11}{4} = M12$ | $M21 + \frac{M12 - M21}{2 \text{ or } 8} = M22$ | $M31 + \frac{M22 - M31}{4} = M32$ |
| 3 | P3 | $M12 + \frac{P3 - M12}{4} = M13$ | $M22 + \frac{M13 - M22}{2 \text{ or } 8} = M23$ | $M32 + \frac{M23 - M32}{4} = M33$ |

As previously described, since the X coordinate data and the Y coordinate data are determined in a time-divisional manner, the data can be retrieved from the RAM 15X at a fixed time interval (for example, 12 msec), so that the peak positions P in the X direction can be determined at a predetermined time interval using the above-described equation. In Table 1, a peak position P1 is determined at a given point, a peak position P2 is next determined, and a peak position P3 is further determined. Likewise, peak positions P4, P5, P6, and so on are continuously determined at the predetermined time interval.

Note that the time-divisional manner in which the data is transmitted through the system and/or stored in memory may be synchronous with a clock pulse from a clock (not shown) or may be asynchronous with conventional supporting electronic elements (not shown).

In the first filtering, first, the peak position P1 determined at a given point is identified as X coordinate data M11. When the peak position P2 is next determined, the previous x coordinate data M11 is subtracted from the peak position P2, and the resulting value is further divided by a predetermined number m1 (=4) to provide a first corrected value {(P2−M11)/4}. The first corrected value is added to the previous X coordinate data M11 to provide new X coordinate data M12. This procedure is repeated so that a fine oscillation of the peak positions P in the X direction on the input pad 10 can be cancelled. As a finger moves while touching the input pad 10, the coordinate data M11, M12, M13, and so on which are determined through the first filtering are generated at a predetermined time interval. It is implied that the coordinate data would be recovered by one quarter of the moving distance correspondingly to the actual movement of the finger. The first filtering thus allows for a smoother movement of a cursor indicated on a computer screen without oscillation.

According to the present embodiment, data is subjected to the first filtering followed by the second filtering to perform a second-stage correction so that the data which is subjected to the two-stage filtering, i.e., the first filtering and the second filtering, is output from the controller 16 as the coordinate data. This allows for a more detailed correction.

It should be noted that the corrected value in the second filtering for a second-stage correction is changed depending upon whether or not a finger moves by a large amount on the input pad 10.

More specifically, at step S5 shown in FIG. 5, if the travelling distance of the peak position P in the X direction within a predetermined time (for example, 60 msec) or the displacement of the coordinate data M11, M12, M13, and so on which are determined in the first filtering is beyond a predetermined distance, such as when a finger moves by a large amount, the control proceeds to step S6, wherein the divisor m2 to generate the corrected value in the second filtering is set at "2".

For example, at the retrieved data No. 3 in Table 1 above, from the coordinate data M13 after the first filtering, which is a function of the peak position P3 determined at that point, the previous coordinate data M22 after the second filtering is subtracted. The resulting value is then divided by 2 to provide a second corrected value $\{(M13-M22)/2\}$. The second corrected value is added to the previous coordinate data M22 after the second filtering to provide coordinate data M23. At step S7, the controller 16 outputs the coordinate data M23 as the X coordinate data.

At step S5 shown in FIG. 5, if the travelling distance of the peak position P in the X direction within a predetermined time (for example, 60 msec) or the displacement of the coordinate data M11, M12, M13, and so on which are determined in the first filtering is not more than the predetermined distance, such as when a finger rests on the input pad 10, the control proceeds to step S8, wherein the divisor m2 to generate the corrected value in the second filtering is set at "8".

In this case, at the retrieved data No. 3 in Table 1 above, from the coordinate data M13 after the first filtering, which is a function of the peak position P3, the previous coordinate data M22 after the second filtering is subtracted. The resulting value is then divided by 8 to provide a second corrected value $\{(M13-M22)/8\}$. The second corrected value is added to the previous coordinate data M22 after the second filtering to provide coordinate data M23.

Accordingly, since the divisor m2 which is set at "2"and the divisor m2 which is set at "8" for the corrected value in the second filtering are selectively used, when the finger moves by a large amount on the input pad 10, the coordinate data will be recovered correspondingly at a relatively high rate. When a finger rests on the input pad 10, on the other hand, a large oscillation would not be superimposed on the coordinate data even if the detected value at the peak position P oscillates.

Further consider the case where a finger rests on the input pad 10. For example, when the accumulation output 22 exhibits a sharply curved profile as indicated in FIG. 2, the calculated value at the peak position P does not significantly vary, suppressing a significant oscillation of a cursor on a screen even if the coordinate data determined after the second filtering is output as coordinate data. However, when the accumulation output 22 does not sharply vary so as to depict a gently curved profile, the calculated value at the peak position P oscillates strongly. Then, at step S9, the calculated value from (2B–A–C) is compared to a second threshold value. The second threshold value is greater than the first threshold value in step S2.

If it is determined at step S9 that the calculated value from (2B–A–C) is equal to or greater than the second threshold value, the value corrected with the divisor m2 set at "8" in the second filtering is output from the controller 16 as the X coordinate data.

If it is determined at step S9 that the calculated value from (2B–A–C) is smaller than the second threshold value, and is greater than the first threshold value, then third filtering is performed for a third-stage correction at step S10.

The third filtering is performed such that the corrected value with the divisor m3 set at "4" is further added to the X coordinate data M21, M22, M23, and so on which are obtained after the second filtering with the divisor m2 set at "8".

For example, in Table 1, from the coordinate data M23 after the second filtering, which is also a function of the peak position P3, the previous coordinate data M32 after the third filtering is subtracted. The resulting value is then divided by "4" to provide a third corrected value $\{(M23-M32)/4\}$. The third corrected value is added to the previous coordinate data M32 after the third filtering to provide coordinate data M33. At step S7, the controller 16 outputs the coordinate data M33 as the X coordinate data.

That is, the corrected value which is added to the coordinate data when the calculated value from (2B–A–C) is smaller than the second threshold value at step S9 is made smaller than the corrected value which is added to the coordinate data when the calculated value is not smaller than the second threshold value.

Therefore, if the accumulation value 22 varies modestly and the calculated value at the peak position P is susceptible to oscillation, the third-stage correction through the third filtering further suppresses oscillation of the cursor on the screen.

Alternatively, the first filtering may be eliminated, or the divisors m1 to m3 for the corrected values in the different filtering stages may be set to any desired number. Similarly, the X-electrodes and Y-electrodes may be spaced at unequal intervals, and the time spacing between acquiring of the accumulation values used for calculation of each peak position may not remain constant.

In another embodiment (not shown), to determine the peak position the calculation may use multiple previous and succeeding values rather than merely using previous and succeeding values that are immediately adjacent to the peak value.

As mentioned above, according to the input device of the present invention, coordinate data is not output when the variation of capacitances on the input pad is small. Erroneous detection can thus be avoided, for example, when a palm unintentionally touches the input pad.

By selectively using the corrected values when the capacitances varies sharply, for example when a finger or pen touches the input pad, oscillation of a cursor on a screen can be suppressed while the object rests/does not move on the input pad.

While the invention has been described with reference to specific embodiments, the description is illustrative of the invention and not to be construed as limiting the invention. Various modifications and applications may occur to those skilled in the art without departing from the true spirit and scope of the invention as defined in the appended claims.

What is claimed is:

1. An input device comprising:
   an input mechanism to detect a variation of capacitances at a plurality of detection points; and
   a control unit to calculate detection outputs from the plurality of detection points to determine a peak position in the variation of capacitances and to generate coordinate data from the peak position,
   wherein the peak position is determined using a maximum value detected at any one of the detection points, a previous value detected at at least one previous point to the detection point at which the maximum value is obtained, and a following value detected at at least one point which follows the detection point at which the maximum value is obtained, and said control unit outputs the coordinate data only when a variation of the maximum value varies from the previous value and the following value is greater than a first threshold value.

2. An input device comprising:
   an input mechanism to detect the variation of capacitances at a plurality of detection points; and
   a control unit to calculate detection outputs from the plurality of detection points to determine a peak position P in the variation of capacitances and to generate coordinate data at a fixed time interval from the peak position,
   wherein said control unit performs a first correction between the peak position, determined at a given point, and coordinate data M obtained at a previous point such that a corrected value is added to the coordinate data, the corrected value being smaller than the peak position minus the coordinate data, and
   said control unit: performs the calculation using a maximum value detected at any one of the detection points, a previous value detected at at least one previous point to the detection point at which the maximum value is generated, and a following value detected at at least one point which follows the detection point at which the maximum value is generated, the first correction used when a variation of the maximum value from the previous value and the following value is less than a threshold value being smaller than when the variation is not less than the threshold value.

3. An input device according to claim 2, wherein the first correction is performed when a displacement of the peak position is within a predetermined distance.

4. An input device according to claim 2, wherein the corrected value is calculated by subtracting (Mn−1) from a function of Pn and by dividing a resulting value by a predetermined integer m, where Pn indicates the peak position determined at a given time, and (Mn−1) indicates coordinate data determined at a previous time.

5. An input device according to claim 4, wherein a second correction is performed, prior to the first correction, using the integer m as a predetermined value when a displacement of the peak value is within a predetermined distance, the displacement of the peak being determined at constant time intervals, and the first correction uses one of the same integer m and a different integer.

6. An input device according to claim 1, wherein the value calculated from (2B−A−C) is compared to the threshold value, where B denotes the maximum value at any one of the detection points, A denotes the previous value, and C denotes the following value.

7. An input device according to claim 1, wherein the coordinate of the peak position P is defined by the following equation:

$$P = (\text{coordinate of } B) - \frac{A - C}{2(2B - A - C)}$$

where B denotes the maximum value at any one of the detection points, A denotes the previous value, and C denotes the following value.

8. An input device according to claim 2, wherein the value calculated from (2B−A−C) is compared to the threshold value, where B denotes the maximum value at any one of the detection points Ni, A denotes the previous value, and C denotes the following value.

9. An input device according to claim 2, wherein a coordinate of the peak position P is defined by the following equation:

$$P = (\text{coordinate of } B) - \frac{A - C}{2(2B - A - C)}$$

where B denotes the maximum value at any one of the detection points, A denotes the previous value, and C denotes the following value.

10. An input device comprising:
    an input mechanism to detect a variation of capacitances at a plurality of detection points; and
    a control unit to calculate detection outputs from the plurality of detection points to determine a peak position using the variation of capacitances and to generate coordinate data from the peak position,
    the control unit:
      determining the peak position at a plurality of times that are each separated by a constant time interval and by using a maximum value detected at any one of the detection points, a previous value detected at a first point adjacent to the detection point at which the maximum value is obtained, and a following value detected at a second point adjacent to the detection point at which the maximum value is obtained,
      transmitting the coordinate data only when a combination of a difference between the maximum value and the previous value plus a difference between the maximum value and the following value is greater than a first threshold value, and
      performing a first correction to a first peak position determined at: one time in conjunction with a second peak position determined at a succeeding time to generate coordinate data at the succeeding time, coordinate data being generated such that a first corrected value that is smaller than the second peak position minus the first peak position is added to the first peak position, the first correction being applied only when the combination is less than a second threshold value.

11. An input device according to claim 10, the first correction being performed only when a displacement of the peak position is within a predetermined distance.

12. An input device comprising:
    an input mechanism to detect a variation of capacitances at a plurality of detection points; and
    a control unit to calculate detection outputs from the plurality of detection points to determine a peak position using the variation of capacitances and to generate coordinate data from the peak position, the control unit:
determining the peak position at a plurality of times that are each separated by a constant time interval and by using a maximum value detected at any one of the detection points, a previous value detected at a first point adjacent to the detection point at which the maximum value is obtained, and a following value detected at a second point adjacent to the detection point at which the maximum value is obtained, transmitting the coordinate data only when a combination of a difference between the maximum value and the previous value plus a difference between the maximum value and the following value is greater than a first threshold value, and performing a first correction and a second correction to a first peak position determined at one time in conjunction with a second peak position determined at a succeeding time to generate coordinate data at the succeeding time, coordinate data being generated such that a first corrected value and a second corrected value that are smaller than the second peak position minus the first peak position are added to the first peak position, the second corrected value dependent on whether a displacement of the peak position is within a predetermined distance.

13. An input device according to claim 12, the control unit performing a third correction only if the combination is less than a second threshold value and when the displacement is within the predetermined distance, the third correction being smaller than the second peak position minus the first peak position.

14. An input device according to claim 12, the second corrected value when the displacement is within the predetermined distance being smaller than the second corrected value when the displacement is not within the predetermined distance.

15. An input device according to claim 13, the second corrected value when the displacement is within the predetermined distance added to the third corrected value being smaller than the second corrected value when the displacement is not within the predetermined distance.

16. An input device according to claim 12, each corrected value being calculated by subtracting coordinate data from a function of the second peak position and dividing a resulting value by an integer, the integer for the first corrected value not necessarily being the same as the integer for the second corrected value.

17. An input device according to claim 13, each corrected value being calculated by subtracting coordinate data from a function of the second peak position and dividing a resulting value by an integer, the integer for the each corrected value not necessarily being the same.

18. An input device according to claim 12, the peak position P being defined by the following equation:

$$P = \text{(coordinate of } B) - \frac{A - C}{2(2B - A - C)}$$

where B denotes the maximum value at any one of the detection points, A denotes the previous value, and C denotes the following value.

19. A method of decreasing oscillations of a cursor on a screen, the method comprising:

acquiring data at constant times from variations in capacitance at different locations on an input device;

determining a maximum data value at a particular location, previous and following values detected at adjacent locations to the location of the maximum value;

calculating a present peak position of the data;

calculating a combination of a difference between the maximum value and the previous value plus a difference between the maximum value and the following value;

determining whether the combination is greater than a first threshold value;

correcting each present peak position by adding a difference between the present peak position and a function of a previously determined peak position to the previously determined peak position only when the combination is greater than the first threshold value;

determining whether the present peak position is within a predetermined distance from the previous peak position and correcting the present peak position a second time using a correction value dependent thereon;

generating coordinate data from each corrected peak position; and transmitting the coordinate data.

20. The method of claim 19 further comprising determining whether the combination is less than a second threshold value, and correcting the present peak position a third time only if the combination is less than the second threshold value.

21. The method of claim 19, each correcting comprising correcting by an amount less than the difference between the present peak position and the previously determined peak position.

22. The method of claim 20, each correcting comprising correcting by an amount less than the difference between the present peak position and the previously determined peak position.

23. The method of claim 19, comprising correcting the present peak position by a smaller amount when the displacement is within the predetermined distance than when the displacement is not within the predetermined distance.

24. The method of claim 20, further comprising correcting the present peak position by a smaller amount when the displacement is within the predetermined distance than when the displacement is not within the predetermined distance.

25. The method of claim 19, further comprising correcting the present peak position in each correcting by subtracting coordinate data from a function of the present peak position and by dividing a resulting value by an integer, the integer for the each corrected value not necessarily being the same.

26. The method of claim 20, further comprising correcting the present peak position in each correcting by subtracting coordinate data from a function of the present peak position and by dividing a resulting value by an integer, the integer for the each corrected value not necessarily being the same.

27. The method of claim 19, further comprising calculating each peak position P by:

$$P = (\text{coordinate of } B) - \frac{A-C}{2(2B-A-C)}$$

where B denotes the maximum value at any one of the detection points, A denotes the previous value, and C denotes the following value.

28. The method of claim 20, further comprising calculating the peak position P by:

$$P = (\text{coordinate of } B) - \frac{A-C}{2(2B-A-C)}$$

where B denotes the maximum value at any one of the detection points, A denotes the previous value, and C denotes the following value.

* * * * *

UNITED STATES PATENT AND TRADEMARK OFFICE
CERTIFICATE OF CORRECTION

PATENT NO. : 6,781,577 B2
DATED : August 24, 2004
INVENTOR(S) : Hiroshi Shigetaka It is certified that error appears in the above-identified patent and that said Letters Patent is hereby corrected as shown below:

<u>Title page,</u>
Item [*] Notice, delete "427 days." and substitute -- 499 days. --.

Signed and Sealed this

Eleventh Day of April, 2006

JON W. DUDAS
*Director of the United States Patent and Trademark Office*